United States Patent
Reimink et al.

(10) Patent No.: US 12,316,890 B2
(45) Date of Patent: May 27, 2025

(54) PRESENTING AN AUDIO SEQUENCE WITH FLEXIBLY COUPLED COMPLEMENTARY VISUAL CONTENT, SUCH AS VISUAL ARTIFACTS

(71) Applicant: Camp Courses, LLC, York, PA (US)

(72) Inventors: Jesse Reimink, York, PA (US); Christopher Bolhuis, Hudsonville, MI (US)

(73) Assignee: Camp Courses, LLC, York, PA (US)

( * ) Notice: Subject to any disclaimer, the term of this patent is extended or adjusted under 35 U.S.C. 154(b) by 59 days.

(21) Appl. No.: 18/453,157

(22) Filed: Aug. 21, 2023

(65) Prior Publication Data

US 2024/0073463 A1 Feb. 29, 2024

Related U.S. Application Data

(60) Provisional application No. 63/373,285, filed on Aug. 23, 2022.

(51) Int. Cl.
| | |
|---|---|
| *H04N 21/2368* | (2011.01) |
| *G06F 3/04847* | (2022.01) |
| *G06F 3/0488* | (2022.01) |
| *H04N 21/488* | (2011.01) |

(52) U.S. Cl.
CPC ..... *H04N 21/2368* (2013.01); *G06F 3/04847* (2013.01); *G06F 3/0488* (2013.01); *H04N 21/4884* (2013.01)

(58) Field of Classification Search
CPC .................................................. H04N 21/2368
See application file for complete search history.

(56) References Cited

U.S. PATENT DOCUMENTS

| | | |
|---|---|---|
| 8,103,145 B2 | 1/2012 | Jung et al. |
| 8,166,305 B2 | 4/2012 | Martinez |
| 8,352,873 B2 | 1/2013 | Craig et al. |
| 8,438,485 B2 | 5/2013 | Kulis et al. |
| 9,769,232 B2 | 9/2017 | Liu et al. |

(Continued)

OTHER PUBLICATIONS

Glavitsch et al., "Podcast Archives: Access Through SpeechIndexer Technology," *2014 Society for Imaging Science and Technology, Archiving Conference Final Program and Proceedings*, pp. 197-200.

*Primary Examiner* — Michael H Hong
(74) *Attorney, Agent, or Firm* — Seed Intellectual Property Law Group LLP

(57) ABSTRACT

A facility for presenting an audio sequence with flexibly coupled visual artifacts is described. The facility accesses data that includes the audio sequence described by a range of time indices, multiple visual artifacts, and a mapping from each of the visual artifacts to a subrange of the audio sequence's range of time indices to which the visual artifact relates. The facility initiates playback of the audio sequence at the beginning of the range, and a current time index of the playback advances forward in the range during playback. Each time the current time index enters one of the subranges, the visual artifact mapped to this subrange is displayed. While a first visual artifact is displayed, the facility receives input navigating to a second visual artifact. In response, without affecting the ongoing playback of the audio sequence or its current time index, the facility displays the second visual artifact.

20 Claims, 9 Drawing Sheets

(56) References Cited

U.S. PATENT DOCUMENTS

| | | |
|---|---|---|
| 9,923,962 B2 | 3/2018 | Jones et al. |
| 9,934,223 B2 | 4/2018 | Houh et al. |
| 11,330,348 B2 | 5/2022 | Garmark et al. |
| 11,347,471 B2 | 5/2022 | Prindle et al. |
| 2006/0265503 A1* | 11/2006 | Jones ................. H04L 65/60 709/227 |
| 2008/0222505 A1 | 9/2008 | Chmura |
| 2012/0290931 A1* | 11/2012 | Nurmi ................. G11B 27/34 345/620 |
| 2013/0204413 A1 | 8/2013 | Gehani |
| 2014/0101548 A1 | 4/2014 | Alsina et al. |
| 2016/0299648 A1* | 10/2016 | Migos ................. G06F 3/0487 |
| 2019/0129683 A1* | 5/2019 | Singh ................. G06F 3/0482 |
| 2022/0374585 A1 | 11/2022 | Wang et al. |
| 2022/0398276 A1 | 12/2022 | Shirbhate et al. |

\* cited by examiner

| Artifact Name | Path | Beginning Time Index | Ending Time Index |
|---|---|---|---|
| 1: Shield Volcano | | 3:15 | 6:49 |
| 2: Pahoehoe Lava | | 6:50 | 8:16 |
| 3: Aa Lava | | 8:17 | 12:39 |
| 4: Stratovolcano Schematic | | 12:40 | 29:01 |

Fig. 4

PRESENTING AN AUDIO SEQUENCE WITH FLEXIBLY COUPLED COMPLEMENTARY VISUAL CONTENT, SUCH AS VISUAL ARTIFACTS

CROSS-REFERENCE TO RELATED APPLICATIONS

This application claims the benefit of U.S. Provisional Application No. 63/373,285, filed Aug. 23, 2022 and entitled "METHOD AND APPARATUS FOR DESYNCHRONIZING INTEGRATED AUDIO AND MEDIA," which is hereby incorporated by reference in its entirety.

In cases where the present application conflicts with a document incorporated by reference, the present application controls.

BACKGROUND

Podcasts are audio streams that are typically about a particular topic, sometimes organized into units such as episodes. Podcasts are typically consumed in an audio player, which permits a unit of the podcast to be played from beginning to end, paused, or repositioned from one time index in the stream to another.

BRIEF DESCRIPTION OF THE DRAWINGS

FIG. 4 is a table diagram showing sample contents of an artifact table used by the facility in some embodiments to store information about an episode selected by the user for playing.

DETAILED DESCRIPTION

Figure 1:
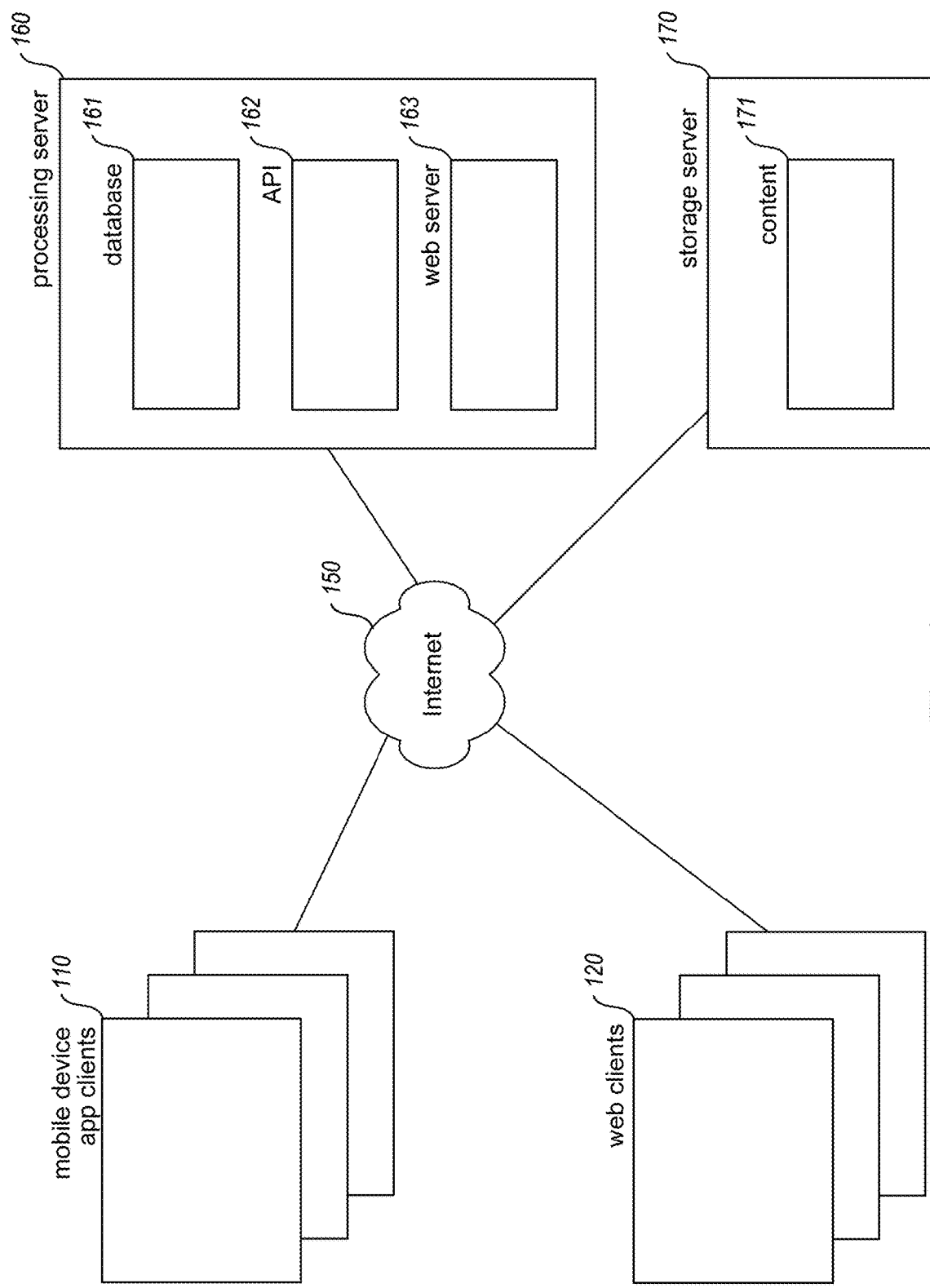
FIG. 1 is a network diagram showing a sample environment in which the facility operates in some embodiments.

The inventors are academics who decided to offer geology lectures as audio streams, each of which is similar to a podcast episode. They had in mind that it would make the understanding of geology concepts much more accessible if someone could learn about them using a smartphone or tablet, or any other mobile or fixed computing device.

They recognized that their geology lectures would benefit from the inclusion of visual aids: still images, or short animations or video clips that illustrate aspects of geology discussed at particular points in particular lectures. They believed that such visual aids would help at least some listeners understand and absorb the substance of lectures.

They realized that their lectures would be more valuable to many listeners if they could be consumed while engaged in other activities, such as walking, biking, or driving. They further considered that these activities tend to include times during which the person is moving and their vision is occupied by viewing and navigating their surroundings, as well as times when movement is paused and their vision is more available.

In response to recognizing this opportunity, the inventors have conceived and reduced to practice a software and/or hardware facility for presenting an audio sequence with flexibly coupled complementary visual content, such as visual artifacts ("the facility"). The facility enables a user to switch back and forth at will between playing the audio sequence and displaying the complementary content in a mode that synchronizes the two, and traversing them independently. With respect to visual artifacts in particular, this permits users to, for example, (1) view the artifact for an audio passage if their vision is available at the time the passage is played, and (2) otherwise, if the artifact has already been replaced by a subsequent one at the time their vision becomes available, swipe backward through the artifacts to return to the one they missed. The facility similarly enables a user to preview the artifacts to establish context for the audio passage, or revisit an artifact that has taken on new significance in light of later audio and/or artifacts.

In some embodiments, an author can use the facility to create such a "visually enhanced audio sequence" by providing (1) an audio sequence having a range of time indexes, often beginning at zero and ending with a time index corresponding to the length of the audio sequence; (2) multiple visual artifacts; and (3) a mapping from each of the visual artifacts to a subrange of the audio sequence's range of time indices. For example, an author who is a geologist may provide an audio sequence about lava; a Shield Volcano diagram and a Pahoehoe Lava photograph; and mappings specifying that the Shield Volcano diagram relates to the time index subrange 3:15-6:49, while the Pahoehoe Lava photograph relates to the time index subrange 6:50-8:16.

If a user chooses to play a particular visually enhanced audio sequence and provides no other input, the facility plays the audio sequence from beginning to end, and, during playback, displays each visual artifact during the time index subrange identified by its mapping, switching to the display of the next visual artifact when the beginning of its time index subrange is reached in the playback. This management of visual artifact display to continue to correspond to present playback position as the present playback position continues is regarded by the inventors as "synchronous" with respect to the audio playback.

During playback, though, the user can provide input navigating among the visual artifacts, such as to look back at a visual artifact earlier displayed in connection with earlier audio, or to peek forward at visual artifacts that relate to later parts of the audio stream. For example, the user can use touch gestures to swipe through the visual artifacts. This navigation of the visual artifacts does not itself reposition the audio playback, which continues as before, so it is regarded as "asynchronous" with respect to the audio playback. However, if the user finds in this navigation of the visual artifacts one that they wish to hear the audio for, they can issue a jump command with respect to that visual artifact, such as by performing a touch gesture on the visual artifact, or touching a jump button within or near the visual artifact. In response, the facility repositions the audio playback to a time index within the visual artifact's time index subrange, such as the time index at its beginning. After this point, as the audio playback reaches the time index subrange of additional visual artifacts, the facility automatically displays each. Thus, at this point, the facility has returned to a synchronous mode.

In some embodiments, the facility also or instead flexibly couples the audio playback with a textual transcript of the audio sequence. In a manner similar to the one described above for flexibly coupling the visual artifacts to the audio sequence, as the audio playback proceeds, the facility automatically scrolls a textual transcript produced from or for the audio sequence in such a way that the text for the portion of the speech presently being played back is visible. At this point, the transcript text and audio playback are being rendered or navigated synchronously. At any time, the user can manually scroll the text to explore portions of the text that were spoken earlier in the playback, or are to be spoken later in the playback—such as by using a dragging touch gesture. At this point, the transcript text and audio playback are being rendered asynchronously. If the user finds a point in the text to which they would like to reposition the audio playback, they can issue a jump command with respect to that position, such as performing a touch gesture on the point in the text, or touching a jump button near the point in the text. In response, the facility repositions the audio playback to a time index near the one corresponding to the point in the text, and resumes scrolling the transcript text to mirror the progression of speech in the audio playback. At this point, the transcript text and audio playback are again being rendered synchronously.

In some embodiments, the facility similarly flexibly couples the audio playback with various other words of complementary content, such as a table of contents for the audio sequence, or an outline of the audio sequence.

By operating in some or all of the ways described above, the facility permits a user to view visual artifacts and/or textual transcript in a way that is automatically synchronized with the relevant parts of an audio playback, but also take control to view the artifacts and/or transcript on the user's own terms, and re-synchronize the audio with a selected artifact or transcript portion. As noted above, this often makes the visually enhanced audio sequence more useful to the user, especially at times when they are engaged in additional activities that occupy their vision sense in variable ways.

Additionally, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by enabling a user to navigate an enhanced audio sequence more efficiently, the facility saves processor cycles that would otherwise be spent playing portions of the audio sequence other than those that are desired at any given moment. Additionally, compared to audio/video slideshow sequences in which the audio track is accompanied at every time index by the current visual artifact, the facility is able to use less voluminous storage resources, since it only stores one copy of each visual artifact, as opposed to many copies each in a different video frame during the visual artifact's entire time index subrange.

FIG. 1 is a network diagram showing a sample environment in which the facility operates in some embodiments. In some embodiments, the facility provides a user-facing "client" portion that operates on client devices used by users, such as smartphones, tablets, wearables, other mobile devices, laptop computers, desktop computers, car computers, etc. In some embodiments, some of these clients 110 access the facility through a mobile app, such as one downloaded and installed by an app store such as the Google Play app store or the Apple iOS app store. In some embodiments, the app is constructed for one or more mobile operating systems using a cross-platform development tool such as ReactNative. In some embodiments, some of the client devices 120 access the facility through a web client that uses a browser installed on these client devices to access the facility.

The client devices are connected via the Internet 150 or another data transfer network to servers used in implementing the facility. These include a processing server 160, and a storage server 170. The storage server stores content 171 used in visually enhanced audio sequences, such as the audio sequence, visual artifacts, transcripts, tables of contents, and outlines, etc. The processing server hosts a database 161 such as a PostgreSQL database containing information about each visually enhanced audio sequence, including the identifying components of which it is made up, and information useable to retrieve them from the storage server. In some embodiments, the app executing on the mobile device app 110 clients calls an application programming interface (API) 162 provided as part of the facility to retrieve information from the database about visually enhanced audio sequences that are available for presentation, including catalog information about each available one, and information useable by the app clients to download from the storage server pieces of content relating to a visually enhanced audio sequence to be played on the client. In some embodiments, the API is implemented using Python on the Heroku platform. In some embodiments, browsers executing on the web clients call a web server 163 executing on the processing server, submitting requests each specifying a URL that causes the web server to serve a dynamic web page containing the facility's user interface, into which are incorporated the information needed by the browser to retrieve the data components stored on the storage server needed to play the visually enhanced audio sequence.

Figure 2:
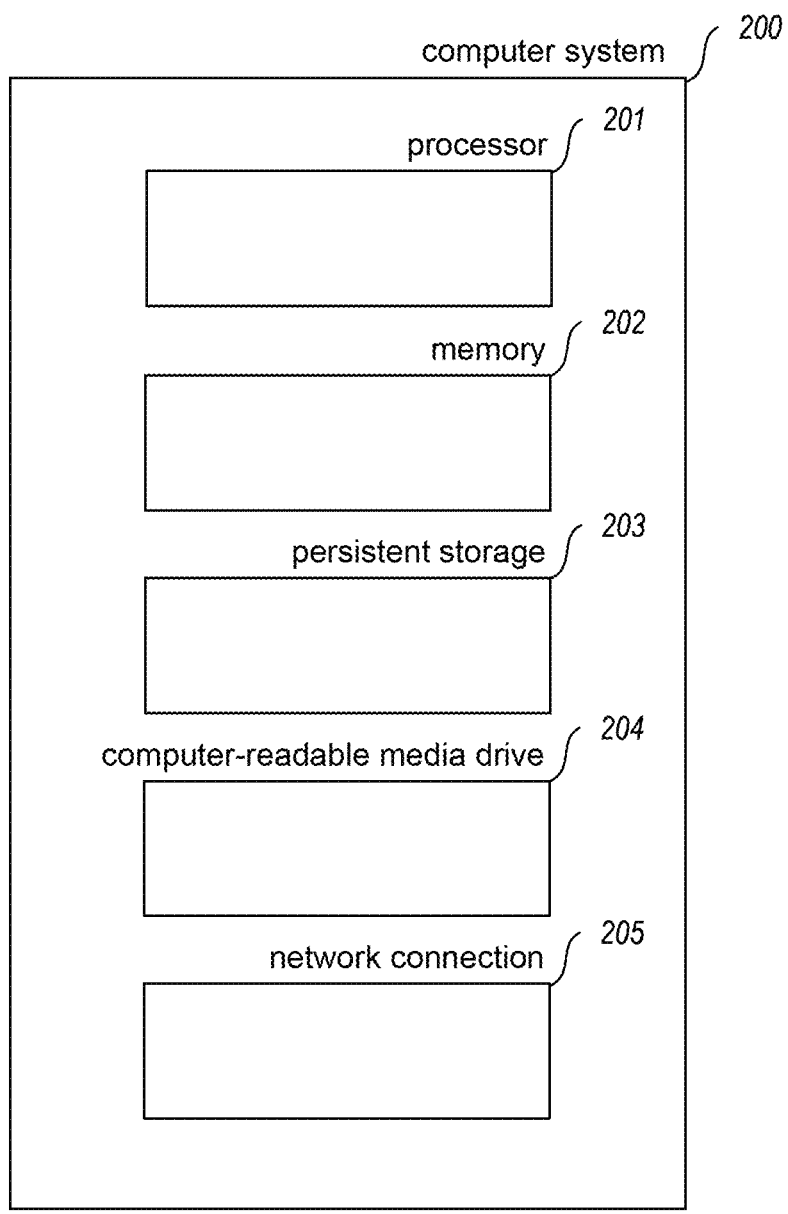
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 201 for executing computer programs and/or training or applying machine learning models, such as a CPU, GPU, TPU, NNP, FPGA, or ASIC; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 3:
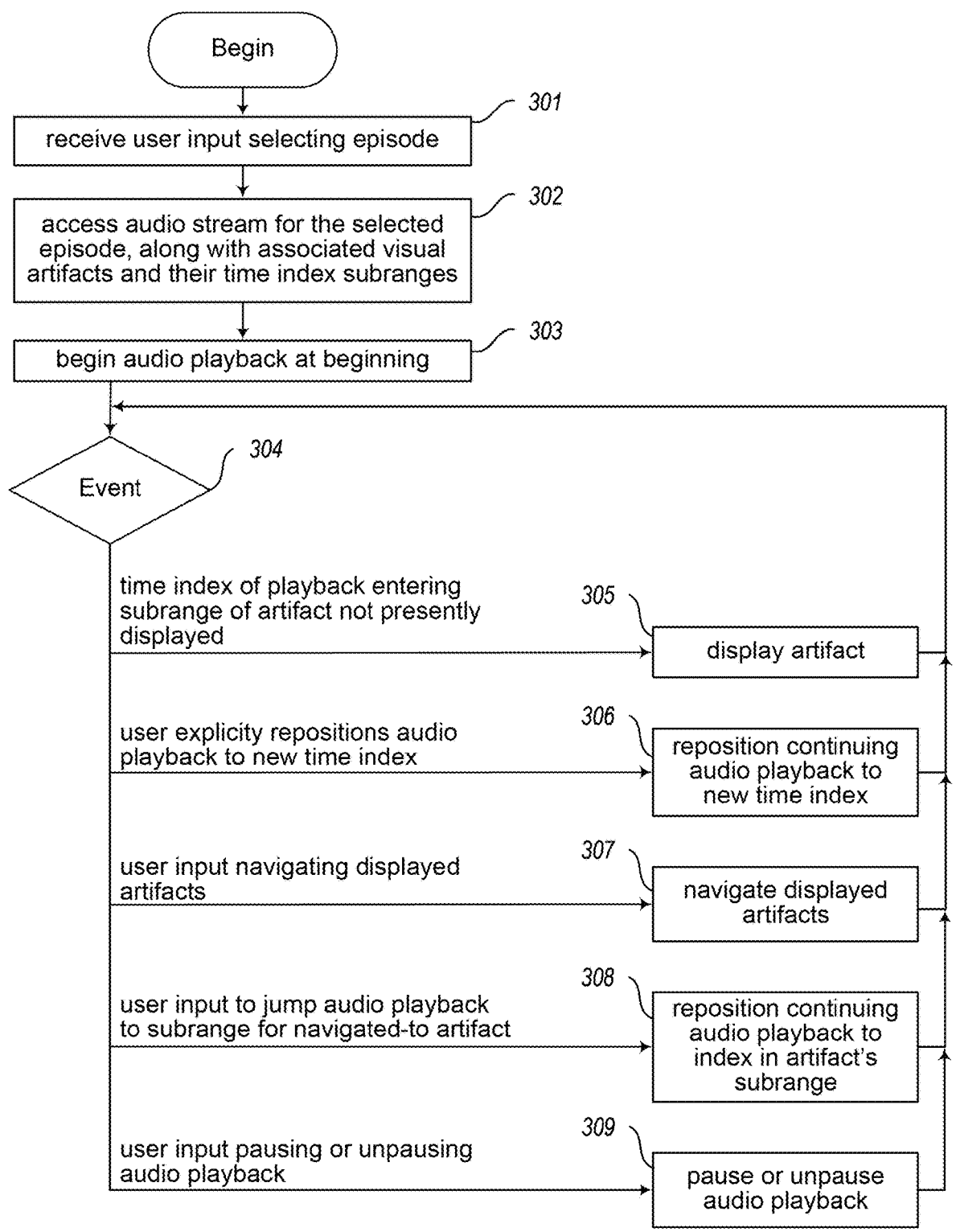
FIG. 3 is a flow diagram showing a process performed by the facility in some embodiments to present a visually enhanced audio sequence.

FIG. 3 is a flow diagram showing a process performed by the facility in some embodiments to present a visually enhanced audio sequence. In act 301, the facility receives user input selecting an episode to present, i.e., a particular visually enhanced audio sequence. In act 302, the facility accesses the audio stream for the episode selected in in act 301, along with associated visual artifacts and the time index subrange to which visual artifact is mapped. In act 303, the facility begins audio playback at the beginning of the audio stream. In act 304, the facility branches based on the type of event that occurs; if the time index of the audio playback enters the subrange of a visual artifact not presently displayed, then the facility continues in act 305 to display this visual artifact. After act 305, the facility continues in act 304 to process the next event. If, in act 304, the user explicitly repositions audio playback to a new time index—such as by dragging a time index slider on the audio player user interface, or clicking a forward or backward button, then the facility continues in act 306 to reposition continuing audio playback of the audio sequence to the time index specified the user's explicit repositioning. After act 306, the facility continues in act 304. If, in act 304, a user input that navigates the displayed artifacts—such as by swiping or otherwise scrolling through them, then the facility continues in act 307 to navigate the displayed artifacts, such that new artifacts among those included in the visually enhanced audio sequence are displayed. After act 307, the facility continues in act 304. If, in act 304, the facility receives user input to jump audio playback to the subrange for an artifact that the user navigated to in act 307—such as by touching that artifact, or a button displayed proximately to that artifact, then the facility continues in 308 to reposition continuing audio playback of the audio sequence to an index that is in the navigated-to artifact's subrange, such as the time index that is at the beginning of this subrange. After act 308, the facility continues in act 304. If, in act 304, the facility receives user input pausing or unpausing audio playback— such as by touching a pause/play button, then the facility continues in act 309 to pause or unpause audio playback. After act 309, the facility continues in act 304.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

FIG. 4 is a table diagram showing sample contents of an artifact table used by the facility in some embodiments to store information about an episode selected by the user for playing. The artifact table 400 is made of rows, such as rows 401-404, each corresponding to a different visual artifact that is part of the episode. Each row is divided into the following columns, an artifact name column 411 containing a name for the artifact; a path column 412 containing information useable by the facility to retrieve the artifact for display; a beginning time index column 413 containing a time index marking the beginning of the subrange of the episode's time range to which the artifact is mapped; and an ending time index column 414 containing the time index at the end of this subrange. For example, row 401 contains a path (not shown) useable to retrieve a "1: Shield Volcano" artifact that is mapped to the time index subrange of 3:15-6:49.

While FIG. 4 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

FIGS. 5-9 are display diagrams showing a progression of example displays presented by the facility as part of presenting a sample visually enhanced audio sequence relating to geological aspects of lava.

Figure 5:
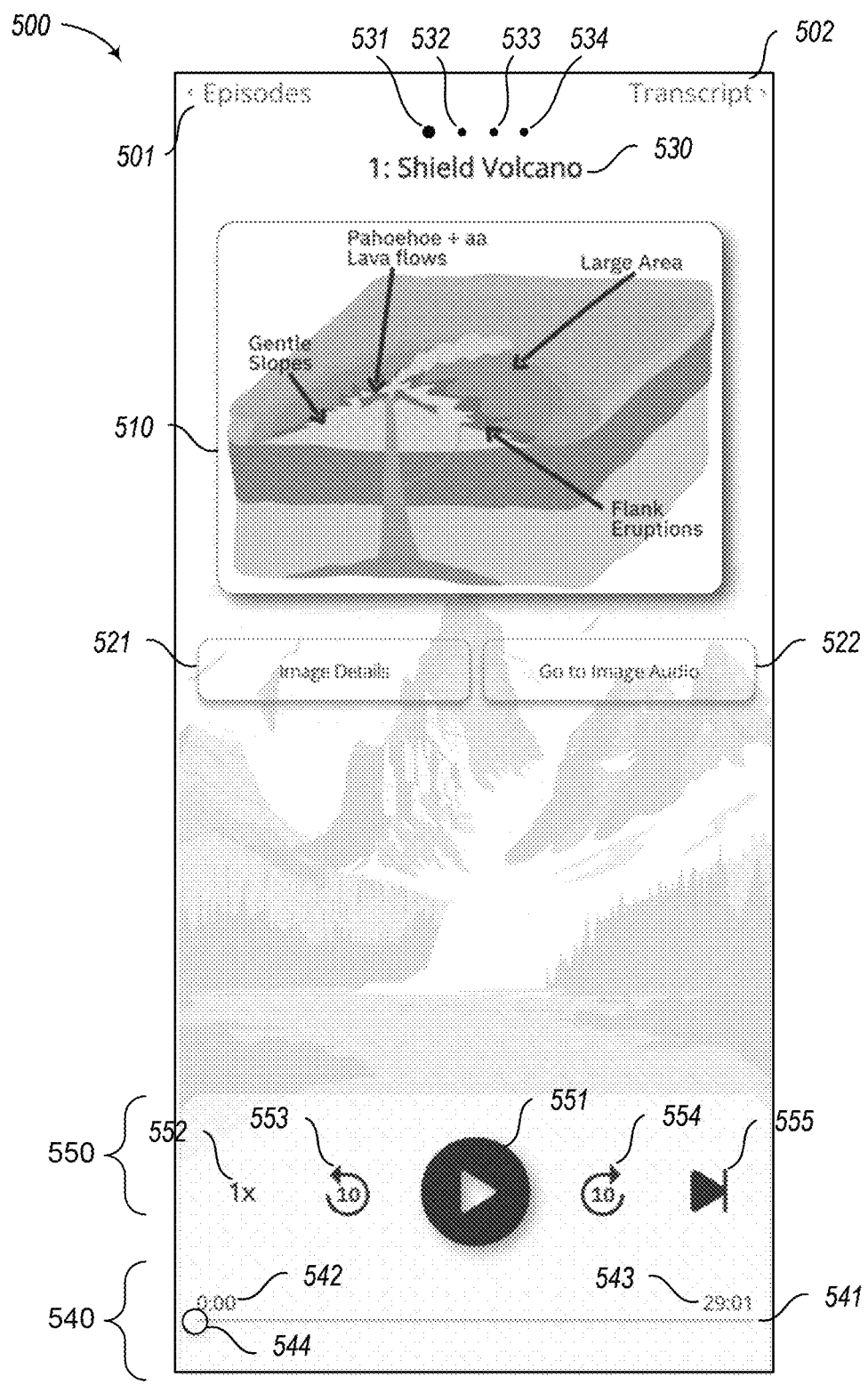
FIGS. 5-9 are display diagrams showing a progression of example displays presented by the facility as part of presenting a sample visually enhanced audio sequence relating to geological aspects of lava.

FIG. 5 is a display diagram showing a first display. The display 500 includes a control 501 that the user can activate in order to display a list of available episodes, and choose an episode to present that is different from the lava episode. The user can activate control 502 to display a textual transcript of the speech that occurs in the episode's audio sequence, which may, for example, have originated as a script for the audio sequence or may have been produced later, such as by human transcription, automatic transcription with or without editing by artificial intelligence or humaneditors, etc. The display includes an image 510 that is one of the visual artifacts included in the episode. In particular, this is the artifact to which 401 of the artifact table relates, which is mapped to the earliest time index subrange among the artifacts. The user can touch a control 521 in order to display textual details about the image—such as a textual description of it, or a control 522 in order to jump playback of the audio sequence to a point in the subrange of the episode's time index range, such as a point at the beginning of this subrange.

The display also includes artifact indicators 531-534 that collectively indicate which artifact is presently being displayed. Because the first indicator 531 is larger than indictors 532-534, the user can discern that the artifact corresponding to this indicator—i.e., the first artifact—is being displayed.

The display also includes the name 530 of the artifact, as well as a time index slider 540 that shows the present time index of the audio playback and allows it to be adjusted, as well as additional playback controls 550. In particular, the slider 540 includes a range line segment 541 that represents the time index range of the entire episode; a current time index indicator 542 showing the present time index of playback; a total time indicator 543 showing the total length of the episode's audio sequence; and a slider handle 544 whose movement along the line segment 541 shows visually the progress of playback, and can be repositioned—such as by dragging—by the user in order to explicitly change the current time index in act 308 to a time index corresponding to the position on the line segment 541 to which the handle is dragged. The additional payback controls include a play/pause control 551 that the user can touch in order to pause audio playback if audio playback is proceeding or resume audio playback if audio playback is paused; a speed control 552 with which the user can interact to modify the speed at which audio playback is occurring; a jump back control 553 that the user can activate in order to move the current time index backward in time, such as by 10 seconds; a jump forward control 554 that the user can activate in order to move the current time index backward in time, such as by 10 seconds; and an advance control 555 to advance to a later time index, such as the time index at the end of the range.

While FIG. 5 and each of the display diagrams discussed below show a display whose formatting, organization, informational density, etc., is best suited to certain types of display devices, those skilled in the art will appreciate that actual displays presented by the facility may differ from those shown, in that they may be optimized for particular other display devices, or have shown visual elements omitted, visual elements not shown included, visual elements reorganized, reformatted, revisualized, or shown at different levels of magnification, etc.

Figure 6:
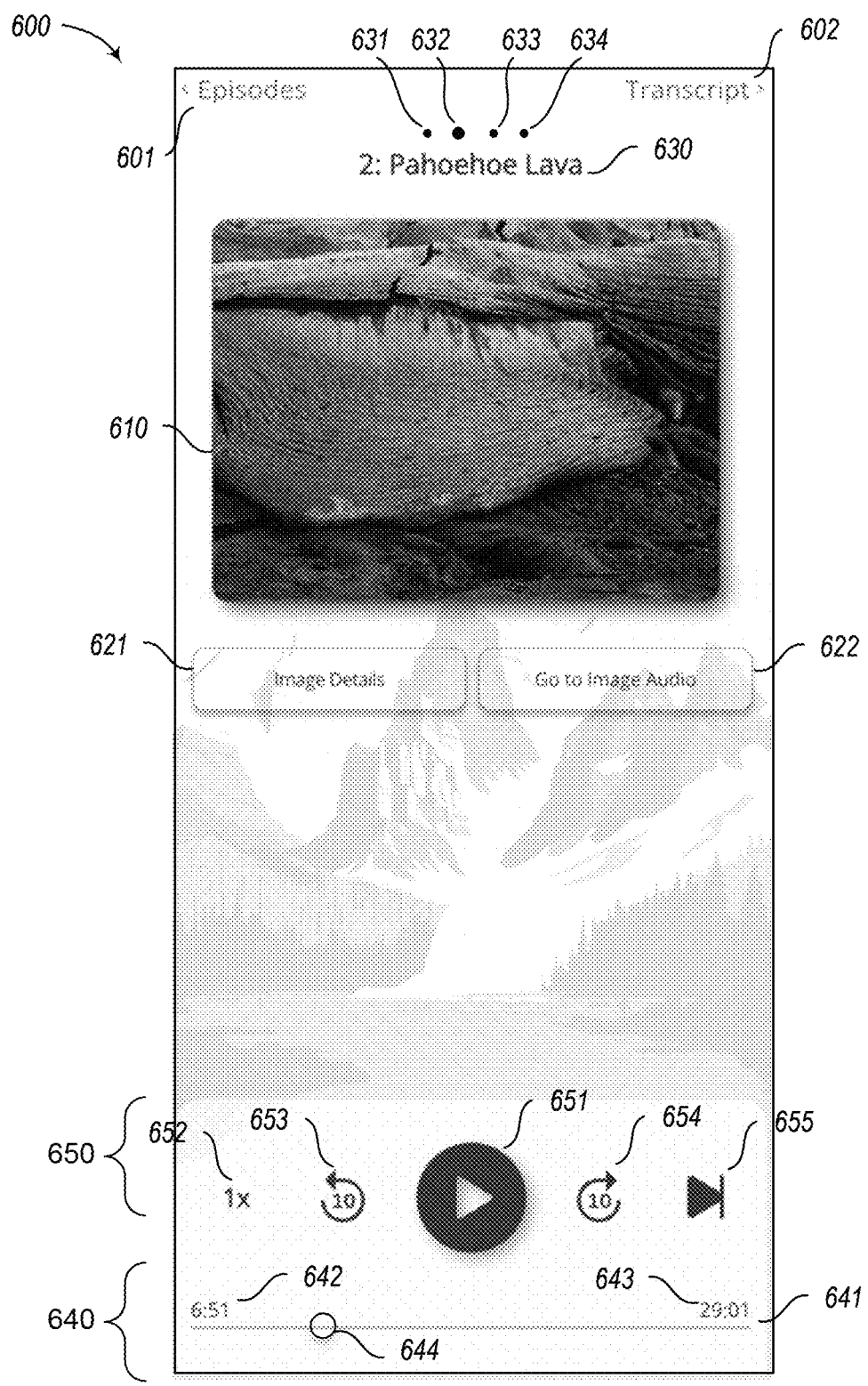

FIG. 6 is a display diagram showing a second display. It can be seen in display 600 that, relative to FIG. 5, the playback has progressed to time index 6:51 642, shown graphically as position 644 of the slider handle. In response to entering time index subrange 6:50-8:16 specified for the second artifact to which 402 of the artifact table corresponds, the facility has automatically replaced the display of first artifact 510 shown in FIG. 5 with second artifact 610. The facility has similarly replaced the title 530 of the first artifact shown in FIG. 5 with the title 630 of the second artifact. The facility has further updated artifact indicators 631-634 to make the second indicator 632 the largest one, identifying the second artifact as the one currently being displayed.

Figure 7:
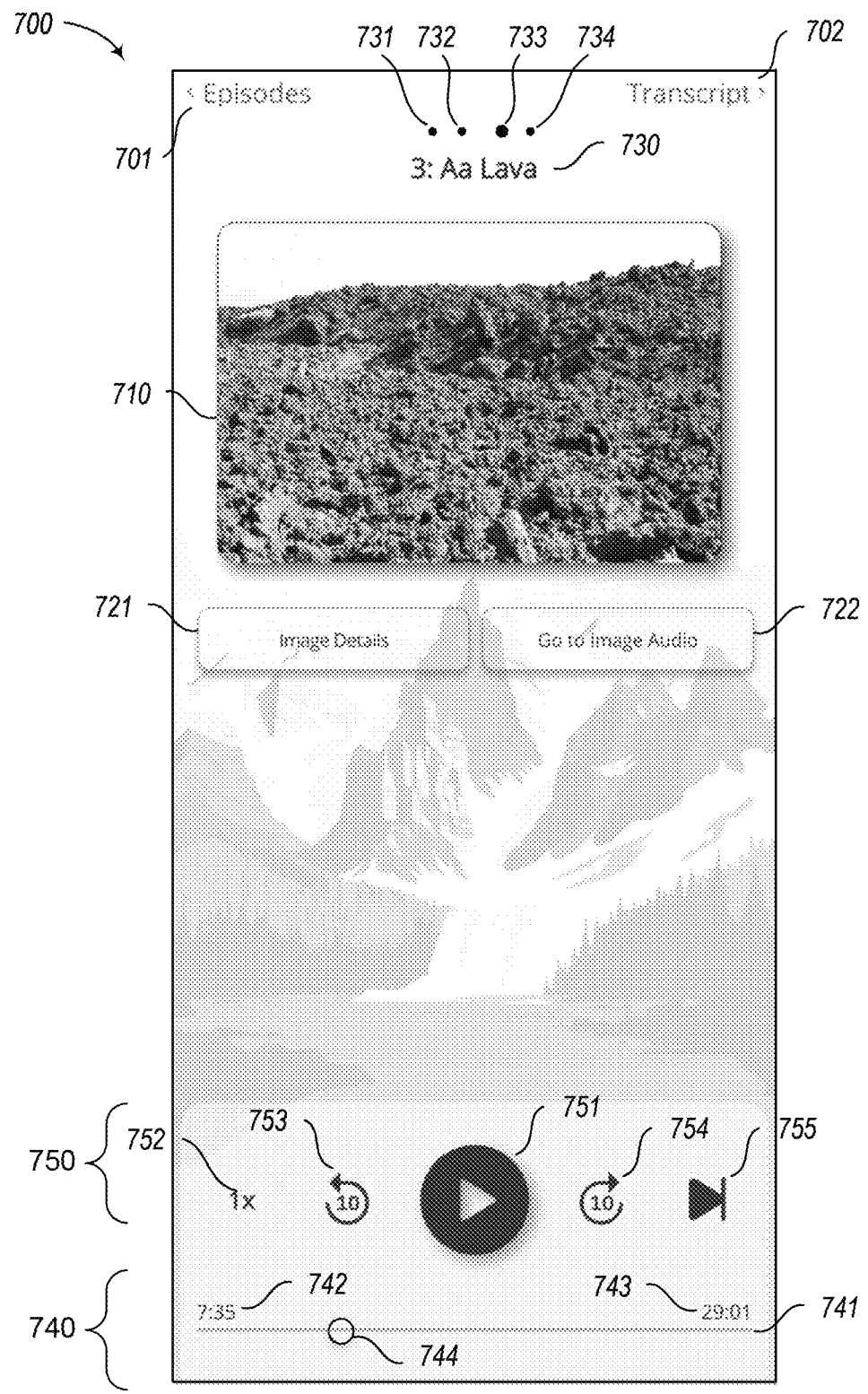

FIG. 7 is a display diagram showing a third display. In display 700, it can be seen that, while the current time index of 7:35 742 is still within the time index 6:50-8:16 for the second artifact, the user has performed a swipe input gesture with respect to the second artifact 610 in FIG. 6 to cause the display of the third artifact 710. The identity of this artifact can be confirmed based upon the larger size of the third artifact indicator, artifact indicator 733. Performing this swipe gesture has not caused any change to the playback of the audio sequence. However, the user can cause a change to the playback of the audio sequence by activating a go to image audio control 722.

Figure 8:
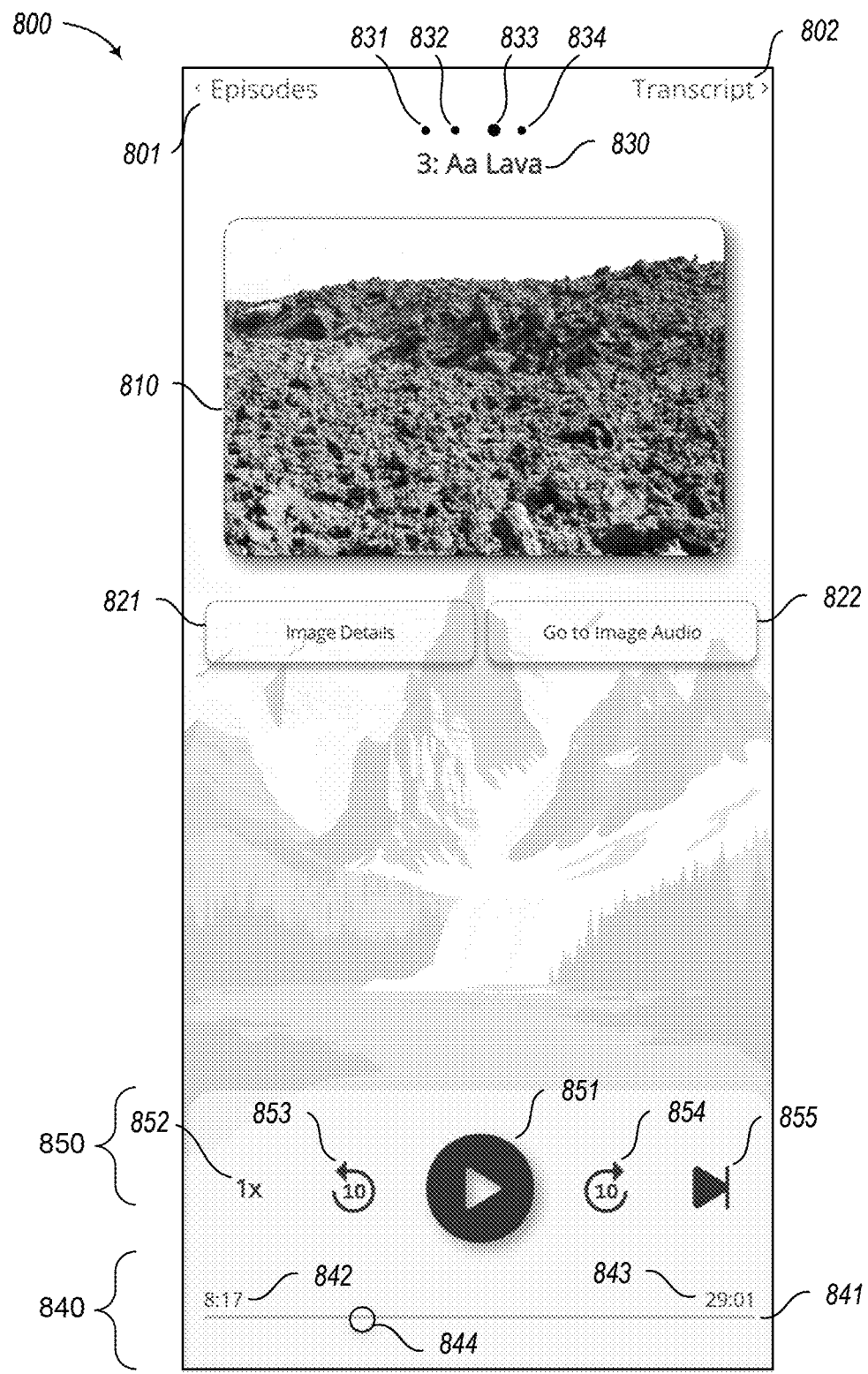

FIG. 8 is a display diagram showing a fourth display. The facility presents display 800 in response to the user's activation of go to image audio control 722 shown in FIG. 7. It can be seen that the current time index 842 has been advanced to time index 8:17 from time index 7:35 742 shown in FIG. 7, at which playback now continues. This is the beginning of the subrange specified for the third, displayed artifact 810: 8:17-12:39. After this repositioning of the audio playback, the facility will automatically advance the displayed artifact in accordance with the advancing current time index, automatically displaying the fourth artifact to which row 404 of the artifact table relates when the time index reaches the beginning of the subrange specified for the fourth artifact, 12:40-29:01.

Figure 9:
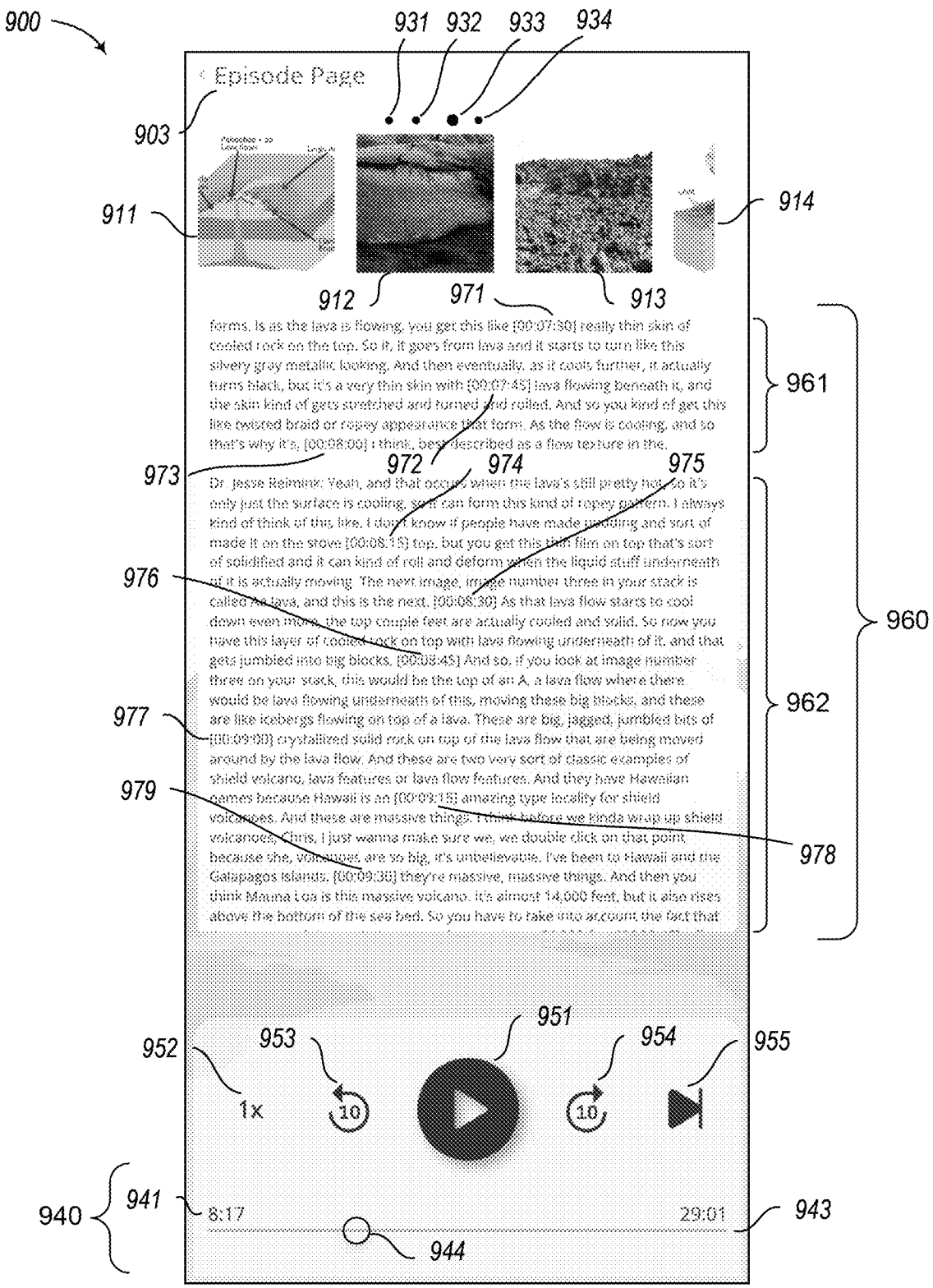

FIG. 9 is a display diagram showing a fifth display. The facility has presented display 900 in response to the user activating the display transcript control 802 shown in FIG. 8. It can be seen that a number of different artifacts 911-914 are displayed near the top of the display. Additionally, a portion 960 of the textual transcript is displayed. This includes portions of two paragraphs, paragraph portion 961 and paragraph portion 962. Initially the display of the transcript is synchronized with the current playback time index, and is automatically scrolled to continuously display text corresponding to the current time index as the current time index advances. However, the user can manually scroll the transcript, such as using swipe or drag gestures with respect to the transcript. After having done so, the user can cause the audio playback to jump to a time index corresponding to a particular point in the transcript. In some embodiments, the user can cause this jump by selecting a point in the displayed portion of the transcript, such as touching a point anywhere in a particular page, paragraph, sentence, phrase, or word. In some embodiments, as shown, the facility displays one or more explicit jump controls 971-979 for the user to touch or otherwise activate in order to jump to the time index identified in each of these controls.

For example, the user can touch control 971 in order to jump audio playback to the time index 7:30, which occurs at the shown point in the sentence "Is as the lava is flowing, you get this like really thin skin of cooled rock on the top." After doing so, the facility resumes automatic scrolling of the transcript in order to track the current playback time index.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system for presenting an audio sequence with flexibly coupled visual artifacts, comprising:
   accessing data comprising the audio sequence described by a range of time indices, a plurality of visual artifacts, and, for each of the plurality of visual artifacts, a mapping between the visual artifact and a subrange of the audio sequence's range of time indices to which the visual artifact relates;
   initiating playback of the audio sequence at a first time index at the beginning of the range, such that a current time index of the playback advances forward in the range;
   each time the current time index enters one of the subranges, causing the visual artifact mapped to this subrange to be displayed;
   at a time when a first visual artifact among the plurality of visual artifacts is displayed, receiving first input navigating among the plurality of visual artifacts;
   in response to receiving the first input, without affecting the ongoing playback of the audio sequence or its current time index, causing to be displayed a second visual artifact among the plurality of visual artifacts;
   receiving second input with respect to the displayed second visual artifact; and
   in response to receiving the second input, altering the current time index of the audio sequence playback to a second time index that is within the subrange to which the second visual artifact is mapped, such that the audio sequence playback continues within the range to which the second visual artifact is mapped.

2. The method of claim 1 wherein the first input represents a swipe gesture performed with respect to the displayed first image.

3. The method of claim 1 wherein the second input represents a tap gesture performed with respect to the displayed second image.

4. The method of claim 1 wherein the second input represents a tap gesture performed on a control displayed proximal to the displayed second image.

5. The method of claim 1, further comprising:
receiving third input specifying a third time index within the range;
in response to receiving the third input:
  altering the current time index of the audio sequence playback to a second time index that is within the subrange to which the second visual artifact is mapped, such that the audio sequence playback continues at the third time index; and
  causing to be displayed a third visual artifact among the plurality of visual artifacts that is mapped to a subrange containing the third time index.

6. The method of claim 1, further comprising:
causing to be displayed a textual transcript of speech that occurs in the audio sequence;
as playback of the audio sequence continues, automatically scrolling the displayed transcript such that text of the transcript corresponding to the current time index of the playback is visible as the current time index of the playback advances;
receiving third input with respect to the displayed transcript navigating the scrolling position of the transcript;
in response to receiving the third input, without affecting the ongoing playback of the audio sequence or its current time index, navigating the scrolling position of the transcript such that text of the transcript corresponding to the current time index of the playback is not visible, but text of the transcript corresponding to a third time index of the playback is visible;
receiving fourth input with respect to the visible text of the transcript corresponding to a third time index of the playback; and
in response to receiving the fourth input, altering the current time index of the audio sequence playback to the third time index, such that the audio sequence playback continues at or near the third time index.

7. The method of claim 1 wherein the accessing is via a wireless connection,
the method further comprising persistently storing the accessed data to enable performance of the entire method at times when the wireless connection is not available.

8. The method of claim 5 wherein the third input represents either a drag gesture performed with respect to a displayed playback position slider reflecting the current time index of the audio sequence playback, or a touch gesture performed on a displayed directional-jump control.

9. A computing system for presenting an audio sequence with flexibly coupled complementary content, comprising:
one or more processors; and
one or more memories collectively having contents configured to cause one or more processors to collectively perform a method, comprising:
  accessing data comprising the audio sequence described by a range of time indices, a plurality of portions of complementary content, and, for each of the portions of complementary content, a mapping from the portion of complementary content to a time index within the audio sequence's range of time indices to which the portion of complementary content relates;
  initiating playback of the audio sequence at a first time index at the beginning of the range, such that a current time index of the playback advances forward in the range;
  each time the current time index reaches a time index mapped to from a portion of complementary content, causing the mapped-from portion of complementary content to be displayed;
  at a time when a first portion of complementary content is displayed, receiving first input navigating among the plurality of portions of complementary content;
  in response to receiving the first input, without affecting the ongoing playback of the audio sequence or its current time index, causing to be displayed a second portion of complementary content;
  receiving second input with respect to the displayed second portion of complementary content; and
  in response to receiving the second input, altering the current time index of the audio sequence playback to the time index to which the second portion of complementary content is mapped, such that the audio sequence playback continues at the time index to which the second portion of complementary content is mapped.

10. The computing system of claim 9 wherein the plurality of portions of complementary content are each an image or animation.

11. The computing system of claim 9 wherein the plurality of portions of complementary content are each a section of a textual transcript of speech that occurs in the audio sequence.

12. The computing system of claim 9 wherein the plurality of portions of complementary content are each an entry in table of contents for the audio sequence.

13. The computing system of claim 9 wherein the plurality of portions of complementary content are each an entry in an outline of the audio sequence.

14. The computing system of claim 9 wherein the accessing comprises calling, one or more times, one or more application programming interfaces exposed to provide access to the data comprising audio sequences including the audio sequence whose data is accessed.

15. A computing system of claim 11 wherein the third input represents a touch gesture performed with respect to the section of the transcript that constitutes the second portion of complementary content.

16. A computing system of claim 11 wherein the third input represents a touch gesture performed with respect to a control displayed proximate to the section of the transcript that constitutes the second portion of complementary content.

17. One or more computer memory devices collectively having contents configured to cause a computing system to perform a method for presenting an audio sequence with flexibly coupled visual artifacts, the method comprising:
accessing data comprising the audio sequence described by a range of time indices, a plurality of visual artifacts, and, for each of the plurality of visual artifacts, a mapping between the visual artifact and a subrange of the audio sequence's range of time indices to which the visual artifact relates;
initiating playback of the audio sequence at a first time index at the beginning of the range, such that a current time index of the playback advances forward in the range;
each time the current time index enters one of the subranges, causing the visual artifact mapped to this subrange to be displayed;
at a time when a first visual artifact among the plurality of visual artifacts is displayed, receiving first input navigating among the plurality of visual artifacts; and in response to receiving the first input, without affecting the ongoing playback of the audio sequence or its current time index, causing to be displayed a second visual artifact among the plurality of visual artifacts.

18. The one or more computer memory devices of claim 17, the method further comprising:
receiving second input with respect to the displayed second visual artifact; and
in response to receiving the second input, altering the current time index of the audio sequence playback to a second time index that is within the subrange to which the second visual artifact is mapped, such that the audio sequence playback continues within the range to which the second visual artifact is mapped.

19. The one or more computer memory devices of claim 18, the method further comprising:
receiving third input specifying a third time index within the range;
in response to receiving the third input:
altering the current time index of the audio sequence playback to a second time index that is within the subrange to which the second visual artifact is mapped, such that the audio sequence playback continues at the third time index; and
causing to be displayed a third visual artifact among the plurality of visual artifacts that is mapped to a subrange containing the third time index.

20. The one or more computer memory devices of claim 17, the method further comprising:
causing to be displayed a textual transcript of speech that occurs in the audio sequence;
as playback of the audio sequence continues, automatically scrolling the displayed transcript such that text of the transcript corresponding to the current time index of the playback is visible as the current time index of the playback advances;
receiving second input with respect to the displayed transcript navigating the scrolling position of the transcript;
in response to receiving the second input, without affecting the ongoing playback of the audio sequence or its current time index, navigating the scrolling position of the transcript such that text of the transcript corresponding to the current time index of the playback is not visible, but text of the transcript corresponding to a third time index of the playback is visible;
receiving third input with respect to the visible text of the transcript corresponding to a second time index of the playback; and
in response to receiving the third input, altering the current time index of the audio sequence playback to the third time index, such that the audio sequence playback continues at or near the second time index.

* * * * *